M. W. RUSSELL.
METER SUPPORT.
APPLICATION FILED FEB. 16, 1918.
1,290,665.
Patented Jan. 7, 1919.
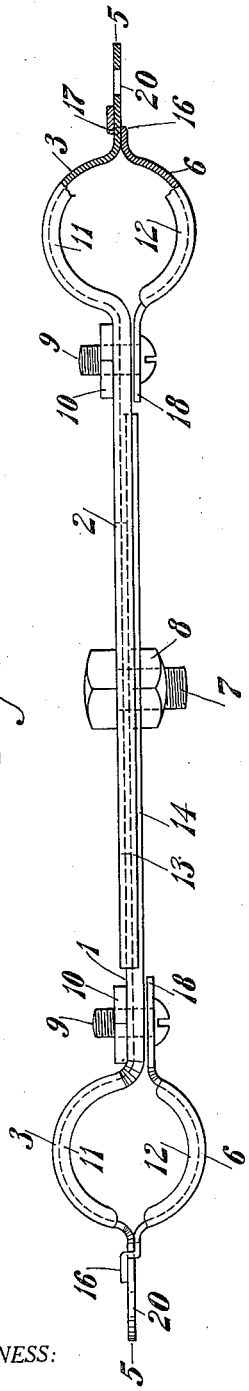
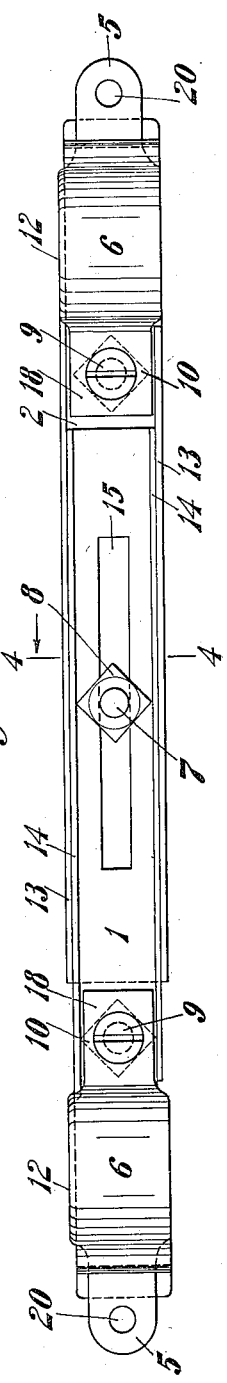
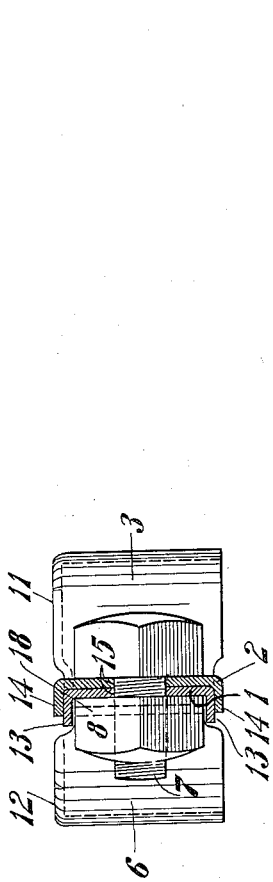
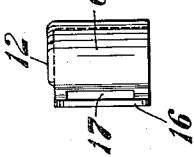
WITNESS:
A. C. Fairbanks
INVENTOR.
Mitchell W. Russell,
BY
Frank A. Cutter,
ATTORNEY.

UNITED STATES PATENT OFFICE.

MITCHELL W. RUSSELL, OF SPRINGFIELD, MASSACHUSETTS.

METER-SUPPORT.

1,290,665.   Specification of Letters Patent.   Patented Jan. 7, 1919.

Application filed February 16, 1918. Serial No. 217,683.

*To all whom it may concern:*

Be it known that I, MITCHELL W. RUSSELL, a citizen of the United States of America, and a resident of Springfield, in the county of Hampden and State of Massachusetts, have invented a new and useful Meter-Support, of which the following is a specification.

My invention relates to improvements in supporting devices, and more particularly to devices that are used to support meters which are suspended or supported from or by their connecting pipes, such as gas meters, and consists in general of relatively sliding or telescoping members of peculiar construction, with securing or fastening means therefor, and clamping members also of peculiar construction and loosely connected with said first-named members, with securing or fastening means for said clamping members, all as hereinafter set forth.

It is customary to attach the swivels, which are connected with the tubes of a gas meter, to standard fittings or couplings with which the gas inlet and outlet pipes are equipped, and also to support said meter from said couplings by means of a device that is secured to the couplings, and from which hang a pair of suspension rods provided with wing-nuts to support a board that extends under the meter, and my support is designed to take the place of the said device that is secured to said couplings.

The primary object of my invention, therefore, is to provide a support which is capable of being attached to and suspended from the standard fittings or the couplings for a meter, and which is simple in construction and application, comparatively inexpensive, safe and secure, and adjustable both to spaces between inlet and outlet pipes and sizes of couplings.

This support although strong and durable is of light weight, especially when stamped out of sheet-metal, and it is in this manner that I prefer to make the device.

Other objects and advantages will appear in the course of the following description.

I attain the objects and secure the advantages of my invention by the means illustrated in the accompanying drawings, in which—

Figure 1 is a top plan of a device which embodies a practical form of my invention, a portion being broken away at one end to show more clearly the construction; Fig. 2, an outer end elevation of one of the clamping members; Fig. 3, a front elevation of said device, and, Fig. 4, an enlarged, transverse section through the device, taken on lines 4—4, looking in the direction of the associated arrow, in Fig. 3.

Similar numerals designate similar parts throughout the several views.

The support, as represented in the drawings, comprises horizontal bars or arms 1 and 2 having adjacent to their outer ends approximately semi-circular, rearwardly-extending yokes 3—3 and terminating at said ends in tongues 5—5, approximately semi-circular, forwardly-extending clasps or clamps 6—6 attachable at their outer ends to said tongues, and each adapted to form with its companion yoke an annulus, a bolt 7 and nut 8 for said arms, and a screw 9 and nut 10 for each of said clamps. The annulus or ring formed by the yoke 3 and the clamp 6, at or adjacent to the outer end of the arm 1 or the arm 2 when said clamp is secured in place, is designed to receive and fit one of the couplings of which mention has been made, and to be supported by and on the coupling, wherefore said yoke and clamp are provided at their upper edges with inturned, arcuate flanges 11 and 12, respectively, said flanges being concentric with the aforesaid ring.

In this case the arms 1 and 2 are channeled to stiffen and strengthen them and make it possible for one of said arms (the arm 1) to slide in the other (the arm 2). Thus the arm 1 may be said to telescope into the arm 2, and the two arms are mutually reciprocable. The arm 2 has upper and under, forwardly-extending flanges 13 to form the channel in which the arm 1 is received, and the latter has upper and under, forwardly-extending flanges 14 which fit within said first-named flanges. There is a central longitudinal slot 15 in each of the arms 1 and 2. The bolt 7 extends through the slots 15, being inserted from the rear, and having the nut 8 screwed on to the terminal of said bolt which protrudes from the arm 1 between the flanges 14. Before tightening the nut 8, the arms 1 and 2 are adjusted longitudinally to whatever extent may be required in order that the yokes 3 shall fit the couplings to which the device is to be attached. After thus adjusting the parts, the nut 8 is tightened against the front face of the arm 1 and the head of the bolt 7 forced against the back side of the arm 2, with the result that the two arms are held securely against relatively independent, endwise movement. The slots 15 are of sufficient length to permit the arms 1 and 2 to be adjusted on the bolt 7 to whatever extent may be necessary. Provision for adjustment of this nature is needed, because the distances apart of the inlet and outlet pipes in different pairs, to which the supporting couplings are attached, may vary, and it is important, not to say necessary, that my support be capable of meeting or conforming to such variation. The flanges 3 are continuations of the upper flanges 14 and 13, respectively.

The tongues 5 are narrower than the yokes 3 from which said tongues extend, and there are openings 20 in said tongues, beyond the clamps 6 when in place, for the suspension rods for the meter of which mention has been made.

At the outer end of each clamp 6 is an angular or stepped part or lug 16 which has a vertical slot 17 in the transverse portion thereof. The lug 16 in each case fits on to one of the tongues 5, with the tongue in the slot 17, the fit or connection being loose so that a combination slip-joint and articulation or hinge is formed by said lug with said tongue. The lug 16, when placed in position, is slipped on over the outer end of its tongue 5, the latter being in the slot 17, and moved toward the yoke, from which said tongue extends, as far as movement in that direction may be permitted to the slotted portion of said lug by the enlarged or widened inner terminal of said tongue. It will now be seen that the clamp lugs 16 can be slipped on and off of the tongues 5, and that the former also can be oscillated more or less on the latter, the clamps 6 being moved toward or away from the yokes 3, to decrease or increase the size of the ring openings.

At the inner ends of the clamps 6 are straight lugs 18 which are parallel with the arms 1 and 2, when said clamps are in place, and the screws 9 are then inserted in alining openings in said lugs and arms, from the front side. The nuts 10 are placed on the protruding rear terminals of the screws 9. The lugs 18 are sufficiently narrow to enter between the adjacent flanges 13 and 14, but said lugs enter between said flanges only when the couplings that carry the support are of small size.

The screws 9 and the parts which they engage position the clamps 6 in such a manner that the approximately semi-circular portions of said clamps are diametrically opposite to the yokes 3; and said screws have a sufficiently loose fit in said parts to meet the conditions imposed by the variation in the amount of take-up.

In practice, after adjusting the length of the support to the distance apart of the couplings to which said support is to be attached, and slipping the yoke flanges 11 over said couplings from the rear, the clamp lugs 16 are slipped onto the tongues 5, the clamps 6 are closed onto said couplings in front with the flanges 12 over the same, the screws 9 are inserted in the lugs 18 and the arms 1 and 2, and the nuts 10 are placed on said screws and tightened. The nuts 10 bear against the back sides of the arms 1 and 2 and draw the heads of the screws 9 against the front sides of the lugs 18, thus forcing the clamps 6 tightly against the couplings and so holding said clamps. Obviously the take-up of the screws 9 and nuts 10 has a considerable range of variation in amount, wherefore the yokes 3 and clamps 6 are capable of engaging practically couplings of different diameters.

Upon removing the nuts 10 and taking out the screws 9, the clamps 6 can be disconnected and the support taken away altogether.

The flanges 11 and 12 are, of course, all on the same level.

When the support is in operative position, its load is directly suspended from and carried by the tongues 5. One means for suspending a meter from this support has been previously mentioned. Since such means is old and well known, also inlet and outlet pipes, couplings, swivels, and meters, it has not been deemed necessary to encumber this specification with illustrations and more detailed descriptions of the same.

More or less change may be made in the shape, size, arrangement, and construction of some or all of the parts of the support, without departing from the spirit of my invention.

What I claim as my invention, and desire to secure by Letters Patent, is—

1. As an improved article of manufacture, a support comprising longitudinally-slotted channeled telescoping arms having approximately semi-circular yokes, and tongues, at their outer terminals, threaded fastening members for said arms, approximately semicircular clamps having loose slip-joint connections with said tongues, and means to secure said clamps to said arms, diametrically opposite to said yokes, the latter and said clamps having at the top inwardly-extending flanges.

2. As an improved article of manufacture, a support comprising members having adjacent to their outer terminals approximately semi-circular yokes provided at the top with inwardly-extending flanges, approximately semi-circular clamps attachable to said members, diametrically opposite to said yokes, said clamps also being provided at the top with inwardly-extending flanges, and fastening means for said clamps.

3. As an improved article of manufacture, a support comprising flanged and slotted arms having approximately semi-circular flanged yokes, and tongues, at their outer terminals, threaded fastening members for the slotted parts of said arms, approximately semi-circular flanged clamps having at their outer terminals slotted lugs to engage said tongues, and at their inner terminals lugs which are adapted to be fastened to said arms, and threaded members to fasten said last-named lugs to said arms, said clamps when in clamping position being diametrically opposite to said yokes.

MITCHELL W. RUSSELL.

Witnesses:
F. A. CUTTER,
A. C. FAIRBANKS.